(12) United States Patent
Kidakarn

(10) Patent No.: US 8,672,761 B2
(45) Date of Patent: Mar. 18, 2014

(54) HAND HELD CONTROLLER WITH PRESSURE CONTROLS

(75) Inventor: Michael Kidakarn, Gardena, CA (US)

(73) Assignee: Michael Kidakarn, Beverly Hills, CA (US)

( * ) Notice: Subject to any disclaimer, the term of this patent is extended or adjusted under 35 U.S.C. 154(b) by 0 days.

(21) Appl. No.: 13/068,400

(22) Filed: May 9, 2011

(65) Prior Publication Data

US 2011/0275436 A1    Nov. 10, 2011

Related U.S. Application Data

(60) Provisional application No. 61/395,280, filed on May 10, 2010.

(51) Int. Cl.
*A63F 9/24* (2006.01)
(52) U.S. Cl.
USPC .......................................................... 463/37
(58) Field of Classification Search
None
See application file for complete search history.

(56) References Cited

U.S. PATENT DOCUMENTS

| | | | |
|---|---|---|---|
| 2001/0001767 A1* | 5/2001 | Miyamoto et al. | 463/30 |
| 2002/0055384 A1* | 5/2002 | Armstrong | 463/37 |
| 2002/0183104 A1* | 12/2002 | Takemoto et al. | 463/4 |
| 2004/0219981 A1* | 11/2004 | Bando | 463/35 |
| 2006/0025217 A1* | 2/2006 | Hussaini et al. | 463/36 |
| 2007/0167232 A1* | 7/2007 | Argentar | 463/36 |

* cited by examiner

*Primary Examiner* — Melba Bumgarner
*Assistant Examiner* — George Howarah

(57) ABSTRACT

A hand held controller includes a controller body, and a control module having a pressure sensitive control, wherein the pressure sensitive control includes a pressing steering control for rotatably control a directional movement of at least one playable object by player's finger and a pressing pedal control for adjustably controlling a speed movement of the playable object by another finger of the player in responsive to a pressure on the pressure sensitive control. Therefore, the hand held controller simulates the real racing techniques to enhance the reality of the video game.

9 Claims, 2 Drawing Sheets

HAND HELD CONTROLLER WITH PRESSURE CONTROLS

CROSS REFERENCE OF RELATED APPLICATION

This is a non-provisional application of a provisional application, application No. 61/395,280, filed on May 10, 2010.

BACKGROUND OF THE PRESENT INVENTION

1. Field of Invention

The present invention relates to a game controller, and more particular to a hand held controller which has pressuring pedal control for controllably adjusting a speed by player's finger in responsive to a pressure pressed on the pressuring pedal control.

2. Description of Related Arts

Game consoles are one of the main entertainment devices in the daily life. The home game entertainment generally comprises an external game console connecting to an external display screen, such as TV, and a game controller wirelessly or by wired connecting to the game console to control and communicate with the game console. Therefore, the player is able to play the game displayed on the external display and to control the game via the game controller.

Remarkable advances have been made in game consoles, such as Nintendo Wii™ or Xbox360™, to give relatively more realistic feelings for the true enthusiasts of video games and/or give a better control thereof. In order to enhance the reality or improved controlling of a game subject, for instances: a combat or a racing game, to make the user more into the game, a video game for the game consoles has not only improved the game graphic quality, such as 3-D effect, but also improved a shape or function of the game controller to incorporate with the game controller of the game console, so as to increase the reality of the video game.

Still some other game controllers comprise two controlling parts to simulate the movement of the video game. For example, the controller for car racing video game has a wheel body having a shaped and size similar to the real car wheel by wire or wirelessly connected to the host of the game console, and a set of pedals electrically connected to the wheel body and the game console, in such a manner that the wheel body and the set of pedals can simulate the movement of driving car by holding the wheel body to make turns and control the speed via the pedals. However, the type of controller is bulky and can only match with limited video game for controlling the specific video game.

Therefore, there are many hand held type game controllers are trying to combine many functions together in one single controller device. Take a car racing game for example. In order to increase the reality of the video game, lot of existing game controllers has a function of vibration, so that when the user triggers a movement, such as driving or hitting, the game controller is vibrating to increase the reality of the game subject.

In this instance, the hand held game controller normally has at least two directional buttons for controlling the direction of the virtual car of the video car racing game, and a button for being pushed to accelerate the speed of the virtual car and released to stop accelerating the speed.

However, the conventional directional left and right buttons are unable to smoothly simulate the turning of the virtual car. The speed control of the racing game can only be accelerated or decelerated via the two controlling method of pushing to increase the speed and releasing the accelerating buttons of game controller to slow down the virtual car, so that the player is unable to adjustably control the speed of the racing game. In other words, the accelerating buttons are unable to maintain a desired speed as the wish of the video game player. In general, the controlling buttons of conventional hand held type game controller can only be controlled in an on-and-off manner, so that the player is unable to adjustably control the desired speed of the playable characters or objects.

In the car racing video game, the existing hand held type game controller is also failed to provide controlling method for simulating the real brake pedal and accelerator pedal to gradually increase or decrease the speed of the virtual car as the real car operation by pressing a variety of pressing force on the controlling buttons.

SUMMARY OF THE PRESENT INVENTION

The invention is advantageous in that it provides a hand held controller, which is incorporated with the pressure sensitive control of a control module, the game controller is able to govern a movement of one or more playable objects of video game by player's finger in responsive to a pressure on the pressure sensitive control.

Another advantage of the invention is to provide a hand held controller, wherein the pressing steering control is able to be rotatably manipulated by the finger of player in responsive to a pressure on the pressing steering control for controlling the directional movement of the playable object of video game.

Another advantage of the invention is to provide a hand held controller, wherein the pressing steering control comprises a steering wheel for being rotatably manipulated by the player's finger to control a rotatable movement in responsive to a pressure on the steering wheel.

Another advantage of the invention is to provide a hand held controller, wherein the pressing pedal control is able to controllably adjust the speed of playable object of video game, especially for a racing type video game, by player's finger in responsive to a pressure on the pressing pedal control.

Another advantage of the invention is to provide a hand held controller, wherein the pressing pedal control comprises an accelerating pedal and a decelerating pedal, so that the player is able to controllably and selectively adjust an accelerating speed and decelerating speed of the movement of the playable object. In the instance of car racing video game, the speed is able to be adjustably increased or decreased in responsive to the pressure on the accelerating pedal and decelerating pedal respectively.

Another advantage of the invention is to provide a hand held controller, wherein the pressing steering control is supported by a rotatable base, which is rotatably coupling at the controller body, so that the manipulating orientation of the steering wheel is able to be adjusted in favor of the comfortableness of the player.

Another advantage of the invention is to provide a hand held controller, wherein the layout position of the pedal is similar to a real racing tool, such as car, so that the hand held controller is able to simulate racing techniques, for instances, drifting, and burn out the tires, so as to enhance the reality of the video game.

Another advantage of the invention is to provide a hand held controller, wherein the car racing video game is able to be selected between automatic or manual mode, wherein a gear control is able to selectively change the gears of the virtual car of the racing video game.

Another advantage of the invention is to provide a hand held controller, wherein the control module is able to incorporate with any conventional shaped controller body with conventional functional buttons in a compacted single device.

Another advantage of the invention is to provide a hand held controller, wherein the display module is able to display related information of the video game. In this instance, the display module is able to display the speed and/or rpm of a car racing game etc.

Another advantage of the invention is to provide a hand held controller, wherein the pressure sensitive control comprises analog pressure sensor module or analog displacement sensor module electrically linked to the pressing steering control and the pressing pedal control for detecting the pressures thereon, so as to control the rotatable movement and speed of the playable object of video game in responsive to the pressures.

Another advantage of the invention is to provide a hand held controller, wherein the LED light arrangement is electrically linked to the pressure sensor module for displaying signals from the LED light arrangement in responsive to the pressure on the pressure sensitive control, so as to indicate the speed of the playable object on the display module. For instance, the LED light arrangement may change its colors depending on the ranges of the speed.

Another advantage of the invention is to provide a hand held controller, wherein the display screen of the display module is able to electrically link to the control circuit to electrically link to the pressure sensor indicated the pressure on the pressure sensitive control for displaying the degree of pressure applied thereon.

Additional advantages and features of the invention will become apparent from the description which follows, and may be realized by means of the instrumentalities and combinations particular point out in the appended claims.

According to the present invention, the foregoing and other objects and advantages are attained by providing a hand held controller for controlling movements of one or more playable object of video game, especially racing type video game, which comprises:

a controller body having a first controlling portion at one side thereof, and a second controlling portion at the other side of the controller body; and a control module having a pressure sensitive control, wherein the pressure sensitive control comprises a pressing steering control for rotatably control a directional movement of at least one playable object by player's finger and a pressing pedal control for adjustably controlling a speed movement of the playable object by another finger of the player in responsive to a pressure on the pressure sensitive control.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
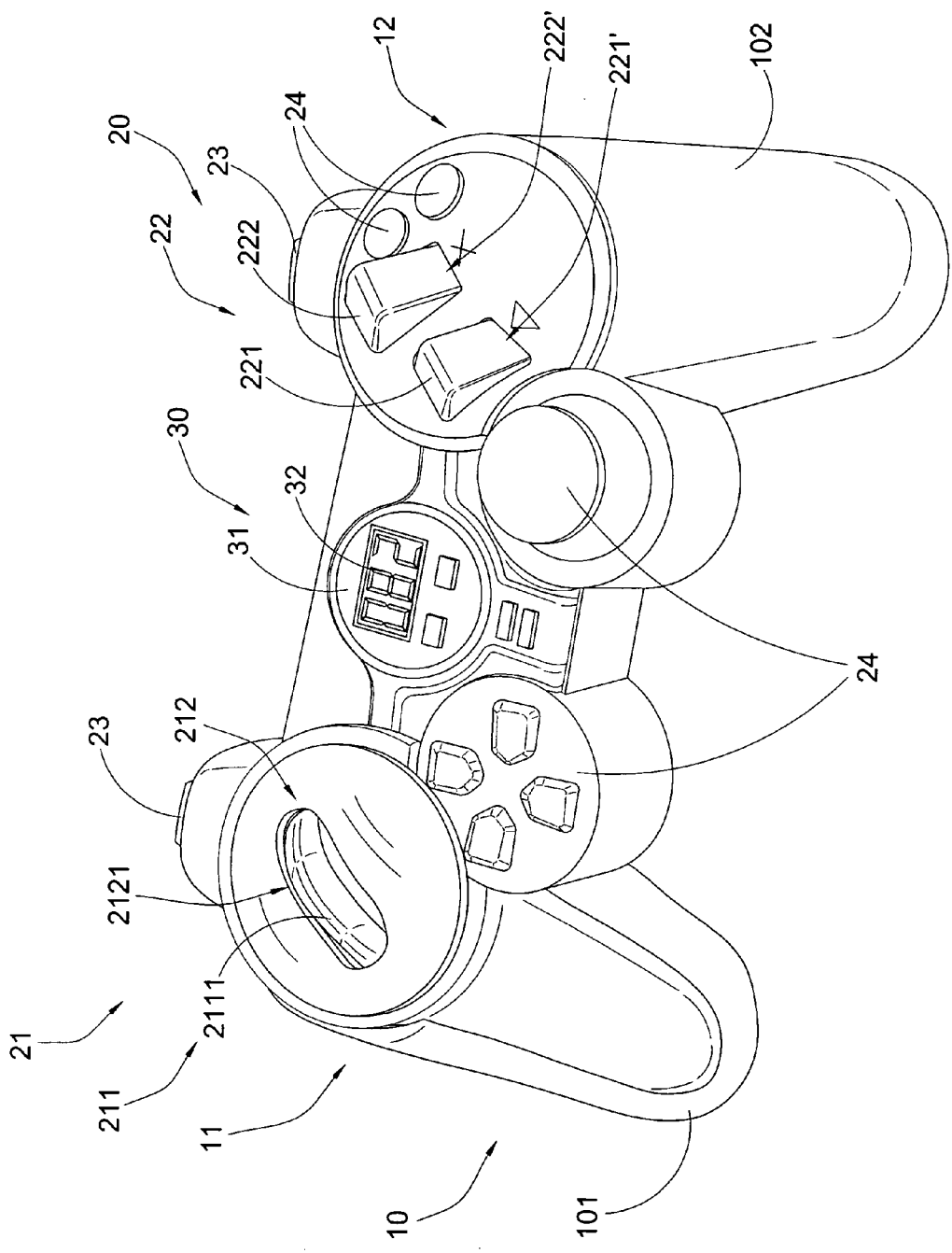
FIG. 1 is a perspective view of a hand held controller according to a preferred embodiment of the present invention.
Figure 2:
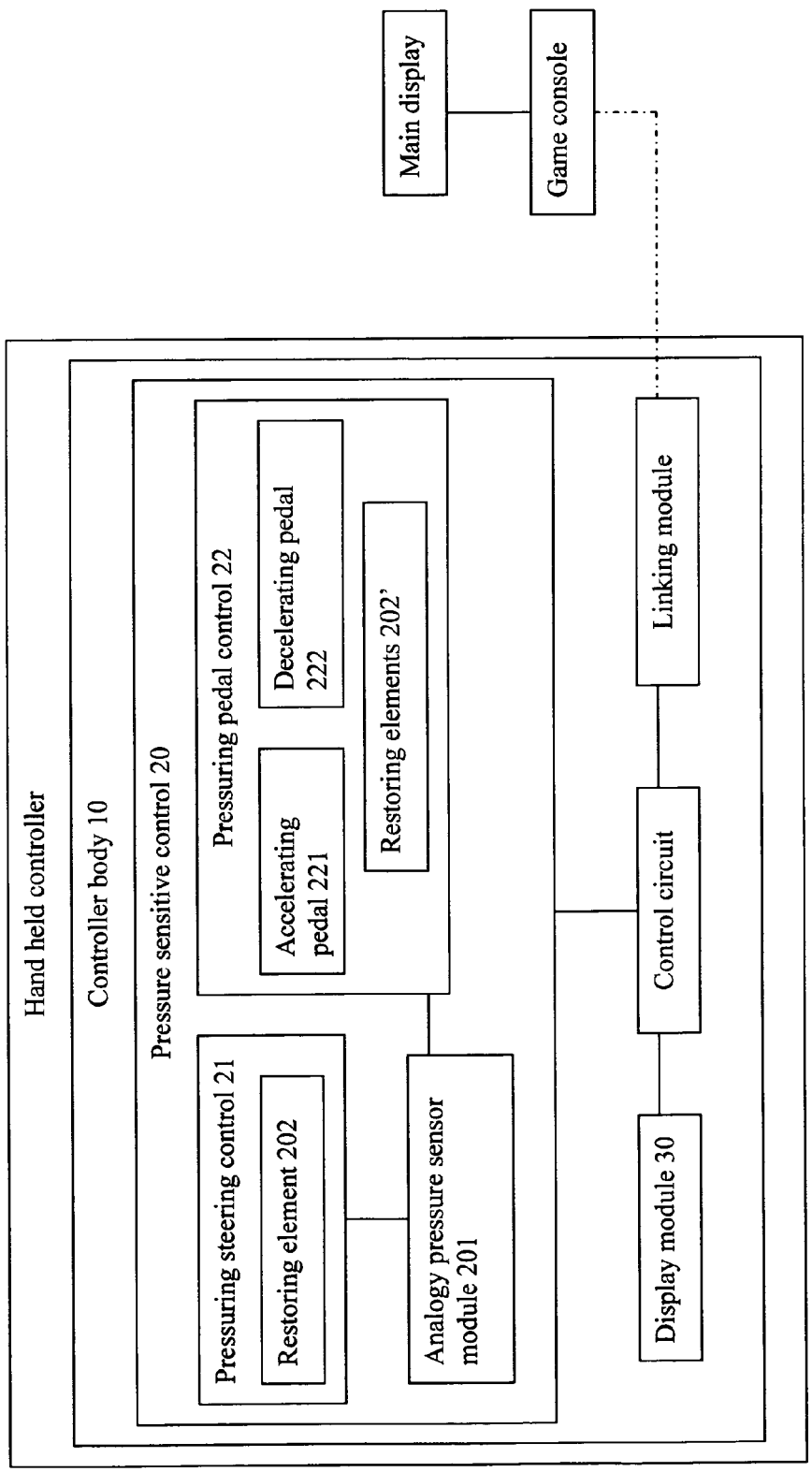
FIG. 2 is block diagram of the hand held controller according to the above preferred embodiment of the present invention.

Referring to FIGS. 1 and 2 of the drawings, a hand held controller for wirely or wirelessly controlling the movements of one or more playable objects of a video game according to a preferred embodiment of the present invention is illustrated, wherein the hand held controller comprises a controller body 10 and a control module electrically linked to a control circuit, which is being housed in a housing of the controller body 10. A linking module is also being housed within the controller body 10 and electrically linked to the control circuit for electrically communicating with the game console, so as to input or output signal of the hand held controller to control the playable object through the control module.

The controller body 10 preferably has a first controlling portion 11 at one side thereof and a second controlling portion 12 at the other side of the controller body. The controller body 10 further has a handle portion for being ergonomically held by hands of video game player. In the preferred embodiment, the handle portion preferably has a first holding part 101 integrally formed at the first controlling portion 11 and a second holding part 102 integrally formed at the second controlling portion 12, wherein the first and second holding parts 101, 102 are symmetrically extended for being held thereon, so that the hand held controller is able to be held with two hands of the player while having at least the thumbs of each hands of player as free fingers for controllably actuating the control module by the free fingers.

The controller module comprises a pressure sensitive control 20 for controlling the movements of the playable object, such as directional movement, or speed of the movement of playable object, by player's finger in responsive to a pressure of the finger pressed or fired on the pressure sensitive control 20.

The pressure sensitive control 20 further comprises a pressing steering control 21 placed at one side of the controller body 10, preferably at the first controlling portion 11 of the controller body, and a pressing pedal control 22 placed at the other side of the controller body 10, preferably at the second controlling portion 12 thereof. The pressing steering control 21 is able to be manipulated by player's finger to control a directional movement smoothly in responsive to a pressure thereon, such as rotatable movement of the playable object. The pressing pedal control 22 is provided for mainly controlling the speed of the movement of the playable object by player's finger in responsive to a pressure that the player's finger pressed on the pressing pedal control 22. In other words, the pressing pedal control 22 is adapted for adjustably accelerating and decelerating the speed of the playable object in a continuously linear manner.

Therefore, the hand held controller with the pressure sensitive control 20 is especially suitable for playing a racing type vide game, such as car, flight, boat, snowboarding, or other sport video games. For the sake of convenience, the followings description will take the car racing game for example to illustrate the functions and structure of the hand held controller.

As a result, the pressing steering control 21 is provided for controlling the rotatable movement of the playable object while controlling the speed of the playable object in the continuously linear manner. In other words, instead of the discontinued turning controlled by conventional left and right buttons, the pressing steering control 21 is able to smoothly and continuously control the direction of the playable object in the substantially linear manner. Unlike the traditional controlling buttons for accelerating and decelerating via the on-and-off or press-and-release controlling manner, the pressing pedal control 22 is able to gradually increase or decrease the speed in the substantially linear manner, so as to adjustably control and maintain at a desired speed.

The pressing steering control 21 of pressure sensitive control 20 preferably comprises a steering wheel 211 rotatably placed at first controlling portion 11 of controller body 10, wherein the steering wheel 211 has a manipulating portion 2111 upwardly protruded at the first controlling portion 11 for being rotatably manipulated by a finger of the player. In this case, the player is able to manipulate the steering wheel 211 via a player's thumb while the rest of fingers are naturally holding the handle portion.

The steering wheel 211 is able to be manipulated preferably by the player's thumb to control the rotatable movement of the player object in the continuously left and right manner, so that the steering wheel 211 is able to simulate a rotating round wheel of real car to control the rotational turning angle of the virtual car of playable object of car racing game in the continuously linear manner.

Furthermore, the pressing steering control 21 may further comprise a restoring element 202 operatively connected to the steering wheel 211, so that the steering wheel 211 is able to automatically return to its original position after being controllably rotated to deviate away from it's center via the manipulating portion 2111. For instance, the control module may have a spring as the restoring element 202 loaded inside the controller body 10, in such a manner that the steering wheel 211 is able to automatically spring back to the center position of the steering wheel 211.

According to the preferred embodiment of the present invention, the pressure sensitive control 20 further comprises an analogy pressure sensor module 201 electrically linking to the pressing steering control 21 for sensing the pressure pressed on the pressing steering control 21, so that the pressing steering control 21 is able to control the rotational movement of the playable object in responsive to the pressure of the player's finger, as best shown in FIG. 2. Therefore, the player is able to manipulate the steering wheel 211 to controllably perform a sharp turn or a smoothly turn of the virtual car of playable object by the manipulating force of the thumb of the player's finger.

It is worth to mention that instead of providing the pressure sensor module 201, a displacement sensor module could be provided for sensing the displacement of the pressure sensitive control, so that the pressure sensitive control 20 is able to control the movements of the playable object in responsive to a manipulated distance of the pressing steering control 21 and the pressing pedal control 22 by the player's finger.

Accordingly, a rotatable base 212 may further provided for rotatably coupling with an upper face of controller body 10 at the first controlling portion 11 thereof, wherein the pressing steering control 21 is supported and positioned by the rotatable base 212, so that the rotatable base 212 is able to be rotated along the upper face of the controller body 10 to rotatably adjusting a manipulating orientation of the pressing steering control 21. The rotatable base 212 preferably has a slot opening 2121 formed at substantially the same surface of the upper face of controller body 10, wherein the manipulating portion 2111 is fitted at slot opening 2121 at a position movably and upwardly protruded through the slot opening 2121. Therefore, when the rotatable base 212 is rotated, the manipulating orientation of the pressing steering control 21 is selectively changed in order to be ergonomically manipulated by the player's finger.

The pressing pedal control 22 preferably comprises at least an accelerating pedal 221 and a decelerating pedal 222 for controllably increasing and decreasing the speed of the playable object respectively in responsive to the pressure on the accelerating or decelerating pedals 221, 222 via the player's finger.

Referring to FIG. 2 of the drawings, each of the accelerating pedal 221 and decelerating pedal 222 is connected to the analogy pressure sensor module 201 for sensing the pressure on the accelerating or decelerating pedal 221, 222, so that the pressing pedal control 22 is able to continuously and controllably adjust the speed in responsive to the pressure thereon, so as to control the speed in the substantially linear manner. The accelerating pedal 221 and decelerating pedal 222 are spacedly located on the upper face of the controller body 10 and preferably slanted at a predetermined angle for being ergonomically pressed or fired by the player's finger, wherein each of the accelerating pedal 221 and decelerating pedal 222 has an inclined pressing surface 221' and 222' respectively for being pressed thereon to control the accelerate or brake function in responsive to the pressure thereon. The pressing surfaces 221' and 222' are upwardly protruded out of the upper face of the controller body 10 at the second controlling portion 12. It is worth to mention that the pressing surfaces 221' and 222' are preferably inclined for being frontwardly and downwardly pressed in the substantially linear manner, so as to simulate the manipulating method of accelerator pedal and brake pedal of real car.

In this instance, the accelerating pedal 221 is preferably located at a slightly upper right side of the upper face of controller body 10 while the decelerating pedal is preferably located at a slightly lower left side of the upper face of the controller body 10, so that the accelerating pedal 221 and decelerating pedal 222 are able to simulate the layout of accelerator pedal lever and brake pedal lever of real car, so as to increase the reality of car racing video game.

As will be readily appreciated by one skilled in the art, the accelerating pedal 221 and decelerating pedal 222 are able to simulate the acceleration and brake function of the real car in responsive to the pressure thereon, so as to perform the speed controlling of virtual car or other playable objects in the linear manner. Therefore, the video game, such as the car racing video game, is able to electrically link with the pressure sensor module to detect variances of pressures in pushing the inclined pressing surfaces 221' and 222' by the player's fingers, so as to control the speed of playable object shown on a main display electrically connected to the game console in the linear manner. Thus, the virtual car of playable object of car racing video game is reacting smoothly and differently via the hand held controller of the present invention. The speed of playable object is able to be controllably adjusted and maintain at the predetermined speed as the desire of the player.

The restoring elements 202' may further operatively connect to each of the accelerating pedal 221 and decelerating pedal 222 for automatically returning the accelerating and decelerating pedal 221, 222 to the normal or original position when the pressing force of the player's finger thereon is gone. The restoring element 202' could be a spring loaded inside the controller body 10 to operatively connect with the pressing pedal control 22, so that when the pressing force thereon for manipulating the pressing pedal control 22 by fingers is disappeared, the accelerating or decelerating pedal 221, 222 is able to automatically spring back to the normally and upwardly original position. It will be appreciated that the rotatable base can be provided at the second controlling portion 12 to incorporate with the pressing pedal control 22 for adjusting the manipulating orientation thereof in accordance to each of individual players' preference.

The control module of hand held controller may further comprise two shoulder buttons 23 preferably placed along the peripheral edge of the controller body 10 at front end thereof. In this instance, the shoulder buttons 23 are able to incorporate with the pressing steering control 21 and the pressing pedal control 22 for changing gears of virtual car, when the player selected the manual mode of the car racing video game, so as to simulate the clutch pedal of real car.

Accordingly, the first and second holding parts 101, 102 of the handle portion of controller body 10 are preferably designed in accordance with the ergonomic for being held thereat by two hands of the player respectively. Preferably, the player is able to hold each of the holding parts 101, 102 to manipulate the pressing steering control 21 by the thumb of fingers of one hand while the thumb of finger of the other hand is for ergonomically manipulating the pressing pedal control 22. Also, each of the index fingers of player is able to comfortably and ergonomically manipulate each of the shoulder buttons 23 respectively, so as to incorporate the shoulder buttons with the pressure sensitive control 20.

It should be noted that the arrangement of the pressing steering control 21 and pressing pedal control 22 preferably at two side 11, 12 of controller body 10 respectively, so that pressure sensitive control 20 has a layout which is similar to the layout of the rotating wheel and accelerator and brake pedal of real car or the like, so as to enhance the reality of the racing video game. However, the steering control 21 and pressing pedal control 22 could be interchangeably located at the first or second controlling portion 11, 12 of the controller body 10.

A plurality of basic functional buttons 24, such as traditional action buttons, may also incorporating with the hand held controller of the present invention, so that the controller not only have the conventional manipulation functions but also the add-on function for mainly for simulating the racing type video game in one signal game controller.

The pressing steering control 21 and pressing pedal control 22 of the pressure sensitive control 20 are able to be incorporatively manipulated by fingers of player in responsive to the variant pressures thereon to simulate the controlling feeling and method of real car in substantially linear manner, wherein the pressing steering control 21 is able to simulate the rotational wheel of real car to rotatably steer left and right to enhance the reality of controlling virtual car. The pressing steering control 21 and pressing pedal control 22 together with each other or individually are able to simulate racing techniques of the real racing type activities. Take the car racing video game for instance. Through incorporatively controlling the pressure sensitive control 20 and the shoulder buttons 23, and/or the functional buttons 24 of the hand held controller, the virtual car is able to controllably perform the drifting performance and burn out the tires of virtual car therethrough.

In the preferred embodiment, a display module 30 may further provided for displaying related information of video game. The display module 30 preferably comprises at least a display screen 31, which is preferably embodied as LED screen, wherein the display screen is preferably located on the upper face of controller body 10 at a position between the first and second controlling portions 11, 12 for conveniently displaying related information. For the racing type video games, the display screen 31 is able to display the speed information of the playable objects of video game. Take the car racing video game for example. The display screen 31 could be a digitized screen or a speed meter for showing the speed of the virtual car. The display screen 31 may also display a speed meter and rpm meter of digit for displaying the related speed information of the virtual car.

The display module 30 may further comprises a LED light arrangement 32 preferably comprising a plurality of LEDs provided along the peripheral edge of the display screen 31. The light arrangement 32 electrically linked to the control circuit of the hand held controller is able to change the colors of the LEDs in responsive to the speed ranges of the playable object. For instance, when the speed of virtual is fall into the range of 0-60 (mile/hour) the LEDs of the light arrangement 32 are green; when the speed is fall into the range of 60-80 (mile/hour) the LEDs are turned into orange; and when the speed is fall into the range of 80-100 (mile/hour) the LEDs are turned into red, so as to simulate the speed meter sets of real car.

Furthermore, the display module 30 electrically linked to the pressure sensor through linking to the control circuit is able to display the indicated pressure of the pressure sensor, so that the player is able to read the corresponding information of the pressure that he or she pressed on the pressure sensitive control 20 via the display screen 31 and/or the LED light arrangement 32 of the display module 30. Therefore, the player is able to know and learn how much pressure applying on the pressure sensitive control 20 on the display screen 31 and/or the LED light arrangement 32 of the display module 30. It is worth mentioning that the display module 30 can display the status of the pressure sensitive control 20 and the information of the playable object such as speed or rpm.

It is appreciated that the pressure sensitive control 20 may be able to be modified in order to control a toy car or remote control toy in responsive to the pressure of manipulating force of player. The control module of present invention may be incorporated with a controller of portable type game console device. The pressure sensitive control 20 is mainly simulating any racing type video games for adjustably controlling the playable object in responsive to the manipulating force pressed on the pressure sensitive control 20, and perfectly for car racing type video games, so that the to player is able to control the movement of playable object in substantially linear manner. The present invention provides an improved and more realistic controlling feelings of the hand held controller while providing the multi-functions in single compact hand held controller, so that the player is able to enjoy the playing the video game with optimum performance without buying extra, so as to save the storing space of controller.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A hand held controller for a vehicle racing type video game, comprising:

a controller body having and upper face, a first controlling portion and a second controlling portion, wherein said controller body further has first and second holding parts extended from said first and second controlling portions respectively for being held by hands of a player respectfully; and a controller module which comprises a pressure sensitive control for controlling movements of a playable object of said video game in response to how much pressure applying on said pressure sensitive control, wherein said pressure sensitive control comprises:

an accelerating pedal, having a first inclined pressing surface, provided at said second controlling portion of said controller body for a thumb of the player pressing on said first inclined pressing surface, wherein said accelerating pedal is slanted at a predetermined angle on said upper face to define said first inclined pressuring surface to be frontward and downwardly pressed thereon in a linear manner, wherein said accelerating pedal is pressed for controllably accelerating a speed of a playable object of said video game in response to how much pressure being applied on said first inclined pressing surface of said accelerating pedal;

a decelerating pedal, having a second inclined pressing surface, provided at said second controlling portion of said controller body for the thumb of the player pressing on said second inclined pressing surface, wherein said decelerating pedal is slanted at a predetermined angle on said upper face to define said second inclined pressuring surface to be frontwardly and downwardly pressed thereon in a linear manner, wherein said decelerating pedal is pressed for controllably decelerating the speed of said playable object of said video game in response to how much pressure being applied on said second inclined pressing surface of said decelerating pedal;

wherein said accelerating pedal is located at an upper right side of said upper face while said decelerating pedal is located at a lower left side of said upper face of said controller body to simulate a layout of an accelerator pedal and a brake pedal of a real vehicle;

a steering wheel, which is rotatably supported at said upper face of said controller body, having a manipulating portion upwardly protruded at said upper face of said first controlling portion for controlling a directional movement of said playable object in responsive to turning movement of said steering wheel; and an analogy pressure sensor module, which is connected to each of said accelerating and decelerating pedals, arranged for sensing a substantially linear amount of pressure applied on each of said accelerating pedal and decelerating pedals to control the speed of said playable object of said video in such a manner that said pressing sensitive control gradually increases or decreases the speed of said playable object of said video in responsive to the pressure applied thereon, wherein each of said first and second inclined pressing surfaces of said accelerating and decelerating pedals is inclined for being frontwardly and downwardly pressed with said substantially linear amount of pressure, such that said accelerating and decelerating pedals simulate a layout and operation of so as for simulating the layout of the accelerator pedal and the brake pedal said real vehicle; and a display module linked to said analogy pressure sensor module for displaying a degree of pressure applied on said pressure sensitive control.

2. The hand held controller, as recited in claim 1, wherein said display module comprises a light arrangement provided on said controller body for indicating how much pressure applying on each of said accelerating and decelerating pedals and a display screen located at said controller body between said first and second controlling portions for displaying the speed of said playable object in response to said accelerating and decelerating pedals.

3. The hand held controller, as recited in claim 2, wherein said pressure sensitive control further comprises a rotatable base, which is rotatably coupled with an said upper face of said controller body at said first controlling portion thereof, provided for rotatably adjusting a manipulating orientation of said pressing steering control.

4. The hand held controller, as recited in claim 2, wherein said control module further comprises means for restoring said pressure sensitive control back to its original position when said pressure is released thereon.

5. The hand held controller, as recited in claim 1, wherein said display module comprises a light arrangement provided on said upper face of said controller body for indicating how much pressure applying on each of said accelerating and decelerating pedals and a display screen located at said controller body between said first and second controlling portions for displaying the speed of said playable object in response to said accelerating and decelerating pedals.

6. The hand held controller, as recited in claim 1, wherein said pressure sensitive control further comprises a rotatable base, which is rotatably coupled with a~said upper face of said controller body at said first controlling portion thereof, provided for rotatably adjusting a manipulating orientation of said pressing steering control.

7. The hand held controller, as recited in claim 6, wherein said rotatable base has a slot opening, wherein said manipulating portion is fitted at said slot opening at a position movably and upwardly protruded through said slot opening, wherein when said rotatable base is rotated, the manipulating orientation of said pressing steering control is selectively changed in order to be ergonomically manipulated by the thumb of the player.

8. The hand held controller, as recited in claim 7, wherein said control module further comprises means for restoring said pressure sensitive control back to its original position when said pressure is released thereon.

9. The hand held controller, as recited in claim 1, wherein said control module further comprises means for restoring said pressure sensitive control back to its original position when said pressure is released thereon.

* * * * *